(12) United States Patent
Sharpe et al.

(10) Patent No.: US 9,449,647 B2
(45) Date of Patent: Sep. 20, 2016

(54) TEMPORAL ALIGNMENT OF VIDEO RECORDINGS

(75) Inventors: Bruce Sharpe, Surrey (CA); Malcolm Sharpe, Surrey (CA)

(73) Assignee: Red Giant, LLC, Beaverton, OR (US)

( * ) Notice: Subject to any disclaimer, the term of this patent is extended or adjusted under 35 U.S.C. 154(b) by 818 days.

(21) Appl. No.: 13/525,229

(22) Filed: Jun. 15, 2012

(65) Prior Publication Data

US 2012/0257875 A1    Oct. 11, 2012

Related U.S. Application Data (63) Continuation of application No. 12/349,624, filed on Jan. 7, 2009, now Pat. No. 8,205,148.

(60) Provisional application No. 61/020,699, filed on Jan. 11, 2008.

(51) Int. Cl.
*H04N 5/935* (2006.01)
*G11B 27/10* (2006.01)
*G11B 27/034* (2006.01)

(52) U.S. Cl.
CPC ............. *G11B 27/10* (2013.01); *G11B 27/034* (2013.01)

(58) Field of Classification Search
None
See application file for complete search history.

(56) References Cited

U.S. PATENT DOCUMENTS

| | | | |
|---|---|---|---|
| 4,963,967 A | 10/1990 | Orland et al. | |
| 5,040,081 A | 8/1991 | McCutchen | |
| 5,519,828 A | 5/1996 | Rayner | |
| 6,389,173 B1 | 5/2002 | Suzuki et al. | |
| 6,452,875 B1 | 9/2002 | Lee et al. | |
| 6,728,682 B2 | 4/2004 | Fasciano | |
| 6,993,399 B1 | 1/2006 | Covell et al. | |
| 7,512,886 B1 | 3/2009 | Herberger et al. | |
| 7,603,623 B1 | 10/2009 | Lengeling et al. | |
| 7,668,243 B2 | 2/2010 | Ho et al. | |
| 7,692,724 B2 | 4/2010 | Arora et al. | |
| 2002/0094135 A1* | 7/2002 | Caspi | G06T 7/20 382/294 |
| 2002/0122113 A1* | 9/2002 | Foote | G06T 3/4038 348/48 |
| 2003/0146915 A1 | 8/2003 | Brook et al. | |

(Continued)

FOREIGN PATENT DOCUMENTS

| | | |
|---|---|---|
| EP | 2230666 A2 | 9/2010 |
| WO | 0139130 A1 | 5/2001 |

(Continued)

OTHER PUBLICATIONS

Bregler, Christoph et al., "Video Rewrite: Driving Visual Speech with Audio", ACM Siggraph 97, Proceedings of the 24th Annual Conference on Computer Graphics and Interactive Techniques, 1997, ISBN: 0-89791-896-7, pp. 1-8.

(Continued)

*Primary Examiner* — Hung Dang
*Assistant Examiner* — Sunghyoun Park
(74) *Attorney, Agent, or Firm* — Crawford Maunu PLLC (57) ABSTRACT

Methods and apparatus are provided to establish temporal alignment of media clips. In an example embodiment, first and second media clips each contain an audio portion and the method comprises: determining an estimated global offset between the first and second clips; choosing a first test region of the first clip and identifying a corresponding second test region in the second clip based at least in part on the estimated global offset. The first and second test regions are compared to determine a local offset.

20 Claims, 6 Drawing Sheets

(56) References Cited

U.S. PATENT DOCUMENTS

| | | |
|---|---|---|
| 2003/0160944 A1 | 8/2003 | Foote et al. |
| 2003/0179740 A1 | 9/2003 | Baina et al. |
| 2004/0148159 A1 | 7/2004 | Crockett et al. |
| 2004/0170392 A1* | 9/2004 | Lu et al. ............ 386/96 |
| 2005/0046889 A1 | 3/2005 | Braudaway |
| 2005/0165840 A1 | 7/2005 | Pratt et al. |
| 2006/0008247 A1 | 1/2006 | Minami et al. |
| 2006/0078305 A1 | 4/2006 | Arora et al. |
| 2006/0123445 A1* | 6/2006 | Sullivan et al. ............ 725/38 |
| 2006/0150072 A1 | 7/2006 | Salvucci |
| 2006/0212704 A1* | 9/2006 | Kirovski .......... G06F 21/16 713/176 |
| 2007/0189708 A1 | 8/2007 | Lerman et al. |
| 2008/0005130 A1 | 1/2008 | Logan et al. |
| 2008/0079851 A1* | 4/2008 | Stanger et al. ............ 348/575 |
| 2008/0082510 A1* | 4/2008 | Wang ............... H04H 60/37 |
| 2008/0162577 A1 | 7/2008 | Fukuda et al. |
| 2008/0256448 A1 | 10/2008 | Bhatt |
| 2008/0301341 A1* | 12/2008 | Mosek et al. ............ 710/74 |
| 2009/0087161 A1* | 4/2009 | Roberts et al. ............ 386/66 |
| 2009/0167942 A1* | 7/2009 | Hoogenstraaten ....... H04N 7/24 348/500 |
| 2010/0050083 A1 | 2/2010 | Axen et al. |
| 2010/0083077 A1 | 4/2010 | Paulsen et al. |
| 2010/0146393 A1 | 6/2010 | Land et al. |
| 2010/0183280 A1 | 7/2010 | Beauregard et al. |

FOREIGN PATENT DOCUMENTS

| | | |
|---|---|---|
| WO | 2004040576 A1 | 5/2004 |
| WO | 2009042858 A1 | 4/2009 |
| WO | 2010034063 A1 | 4/2010 |
| WO | 2010068175 A2 | 6/2010 |
| WO | 2010138776 A2 | 12/2010 |

OTHER PUBLICATIONS

Haitsma, J. et al., "A Highly Robust Audio Fingerprinting System", IRCAM, 2002.

Shrestha, P. et al., "Synchronization of Multi-Camera Video Recordings Based on Audio", MM'07, Sep. 23-28, 2007, Germany.

* cited by examiner

FIGURE 7

TEMPORAL ALIGNMENT OF VIDEO RECORDINGS

CROSS-REFERENCE TO RELATED APPLICATIONS

This is a continuation of U.S. application Ser. No. 12/349,624 filed 7 Jan. 2009 and entitled METHODS AND APPARATUS FOR TEMPORAL ALIGNMENT OF MEDIA, which is a non-provisional of U.S. Application Ser. No. 61/020,699 filed 11 Jan. 2008 and entitled METHODS AND APPARATUS FOR TEMPORAL ALIGNMENT OF MEDIA, both of which are hereby incorporated herein by reference for all purposes. This application claims the benefit under 35 U.S.C. §119 of U.S. Application Ser. No. 61/020,699 filed 11 Jan. 2008 and entitled METHODS AND APPARATUS FOR TEMPORAL ALIGNMENT OF MEDIA.

TECHNICAL FIELD

This invention relates to multimedia production. For example, the invention may be applied in digital video editing or digital film editing.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
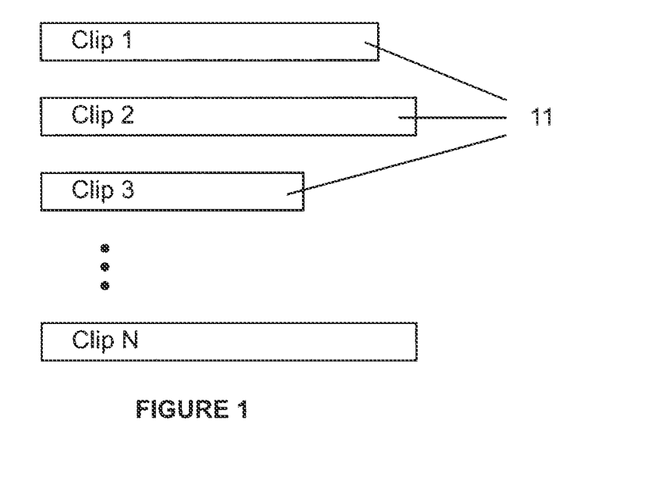
FIG. 1 is a schematic diagram illustrating a number of media clips that may be temporally aligned by methods and apparatus according to embodiments of the invention.

The invention relates to establishing the temporal alignment of media clips to one another. FIG. 1 illustrates an example application. It is desired to create a multimedia production from a collection of media clips 11. As a non-limiting example, media clips 11 may comprise video segments of a scene taken by different cameras. The cameras may have started and stopped at different times. Initially, it may not be known whether clips 11 overlap in time at all and if they do, where and how they overlap with one another. To facilitate using clips 11 in a production, it is desired to align media clips 11 so that the relative timing of corresponding events in the clips can be known.

One aspect of the invention provides methods which may be applied to achieve one or more of:

determining which of clips 11 overlap;

grouping clips 11 into groups where each clip in a group overlaps the timeline of the whole group;

determining precisely where and how clips 11 overlap.

Figure 2:
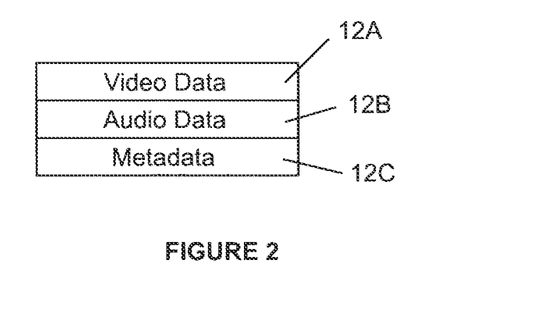
FIG. 2 is block diagram illustrating components of an example media clip.

As shown in FIG. 2, media clips 11 may comprise multiple parts. In the illustrated embodiment, clips 11 contain an audio portion 12A, a video portion 12B and metadata 12C. Metadata refers to any auxiliary data that accompanies the media clip. Metadata may be associated with the clip generally and/or with specific parts of the clip. For example, some video formats permit metadata to be associated with individual frames of video data. Metadata 12C for a clip may include, for example, a start time, a duration, a sampling rate and other information.

To align two media clips one needs to know the relationship between the times at which portions of the clips were acquired. In the simplest case, the relationship may identify one point on the first clip and another point on the second clip that were acquired at the same time. Knowledge of one pair of corresponding points is sometimes inadequate to identify other corresponding points. Differences in frame rates, variability in clock speeds, dropped frames or other factors can affect the times that correspond to points in a clip. Completely specifying the timing relationship for two clips involves identifying, for each point in the first clip that has a corresponding point in the second clip, the corresponding point in the second clip.

Clips may be aligned when their timing relationship is known. For example, in a simple case, two clips may be able to be aligned by shifting all the data of one of the clips by a constant offset. In a more complicated case, achieving alignment may require both shifting and stretching one of the clips. The stretching may be linear or non-linear.

Figure 3:
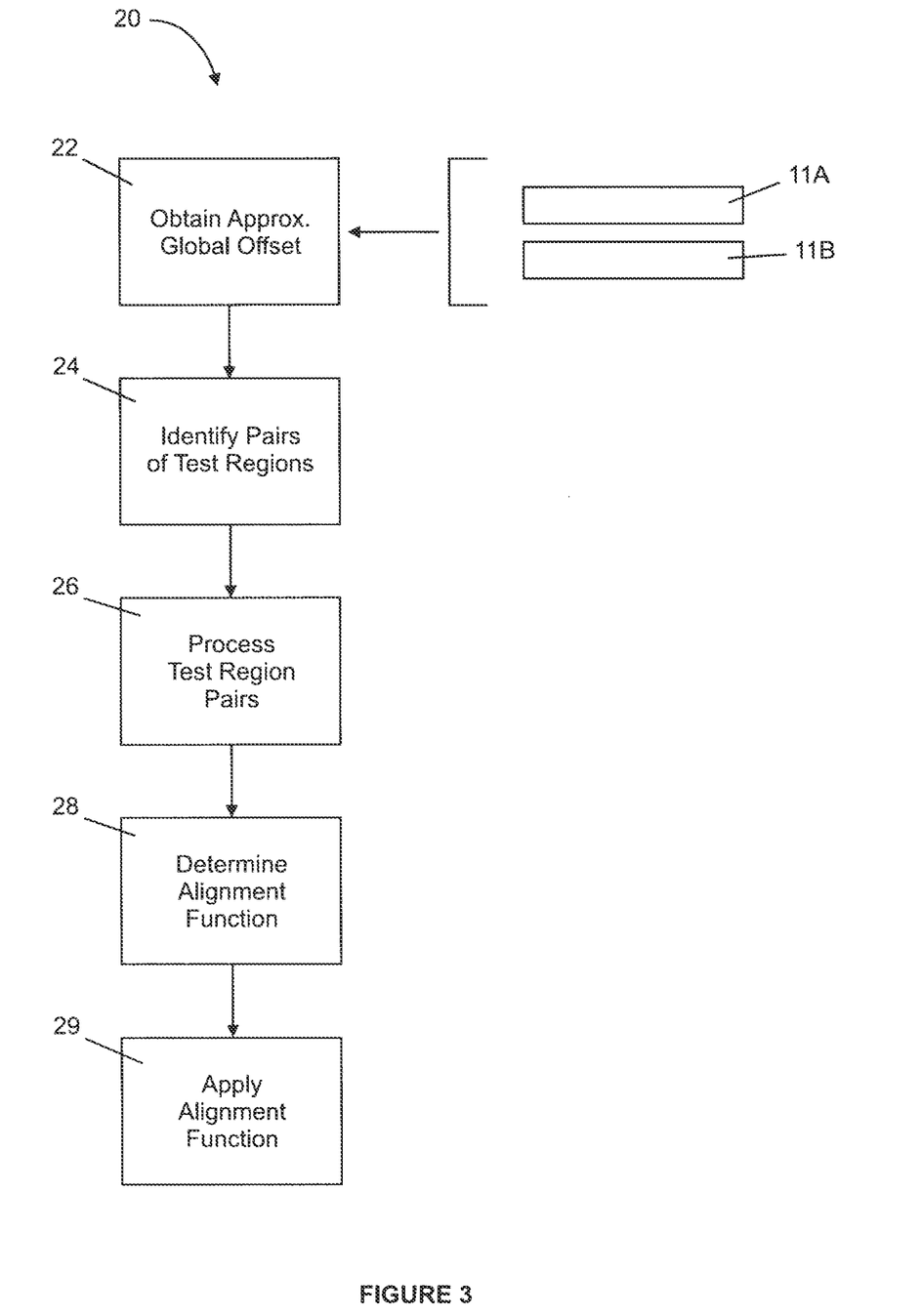
FIG. 3 is a flow chart which illustrates a method according to an embodiment of the invention.

FIG. 3 illustrates a method 20 for determining the alignment between two clips. By taking clips in pairs, method 20 may be applied to determine alignment between any number of clips. Method 20 involves obtaining an approximate global offset between first and second clips 11A and 11B in block 22. In block 24 the approximate global offset from block 22 is used to identify one or more pairs of test regions. In block 26 the pairs of test regions are processed to obtain corresponding local offsets. Block 28 determines an alignment function based on the local offset(s).

Global Offset Determination: Block 24 makes a first determination of the alignment of clip 11A and 11B. It is not necessary that the offset be determined to a high level of accuracy. For example, block 24 may determine an approximate global offset by one or more of:

performing comparisons of subsets of data from the clips;

receiving user input indicating approximate alignment;

performing comparisons of the clip data using a rapid but approximate comparison function;

reading timing information from metadata 12C associated with the clips; and the like.

In some embodiments, comparisons are made of audio data 12B of the clips 11A and 11B. By choosing a large subset of the audio data it is possible to determine a global offset within a large range of possible offsets. To improve processing performance, one may determine only an approximate estimate of the global offset.

Block 24 may comprise selecting one or more test regions in clip 11A. For each such test region, the global offset determined in block 22 may then be used to identify a corresponding test region in clip 11B. Each test region may encompass a relatively smaller subset of the clip. The size of the test region in clip 11B is chosen to be large enough to allow for possible error in the estimated global offset from block 22. In some embodiments, the test regions are small enough that the comparison in block 26 may use the full resolution of the data being compared with acceptable performance.

In block 26 local offsets corresponding to each test region are determined. In an example embodiment, audio portions 12B of clips 11A and 11B are compared in the test regions. The comparison yields a set of local offsets, one for each test region.

Analysis: In block 28, the local offsets of block 26 are examined. An estimate of the alignment of clips 11A and 11B is based at least in part on the local offsets. For example, in the simplest case, only a single pair of test regions is used and the alignment function is the global offset corresponding to the local offset determined in block 26 for that pair of test regions. In other embodiments, two or more pairs of test regions are used and the local offsets are analyzed to determine the nature of the alignment. For example, the alignment could be determined to be one of:

no overlap,
constant offset, or
time-varying offset.

In the cases where there is an overlap, the analysis step in block 28 may determine an alignment function or one or more parameters of a model of the alignment function.

Application: In block 29, The result of the analysis in block 28 is applied to clips 11A and/or 11B or made available to an editing system or the like. Block 29 may include, for example, performing one or more of:

adjusting start times of the clips;
stretching or shrinking the clips;
inserting or removing frames;
etc.

Copies of the original (unmodified) clips 11A and 11B may be preserved.

For example, the start time of one or both clips 11A and 11B may be adjusted to account for a constant offset. The clips are then aligned and may be combined to achieve the desired multimedia production.

Figure 4:
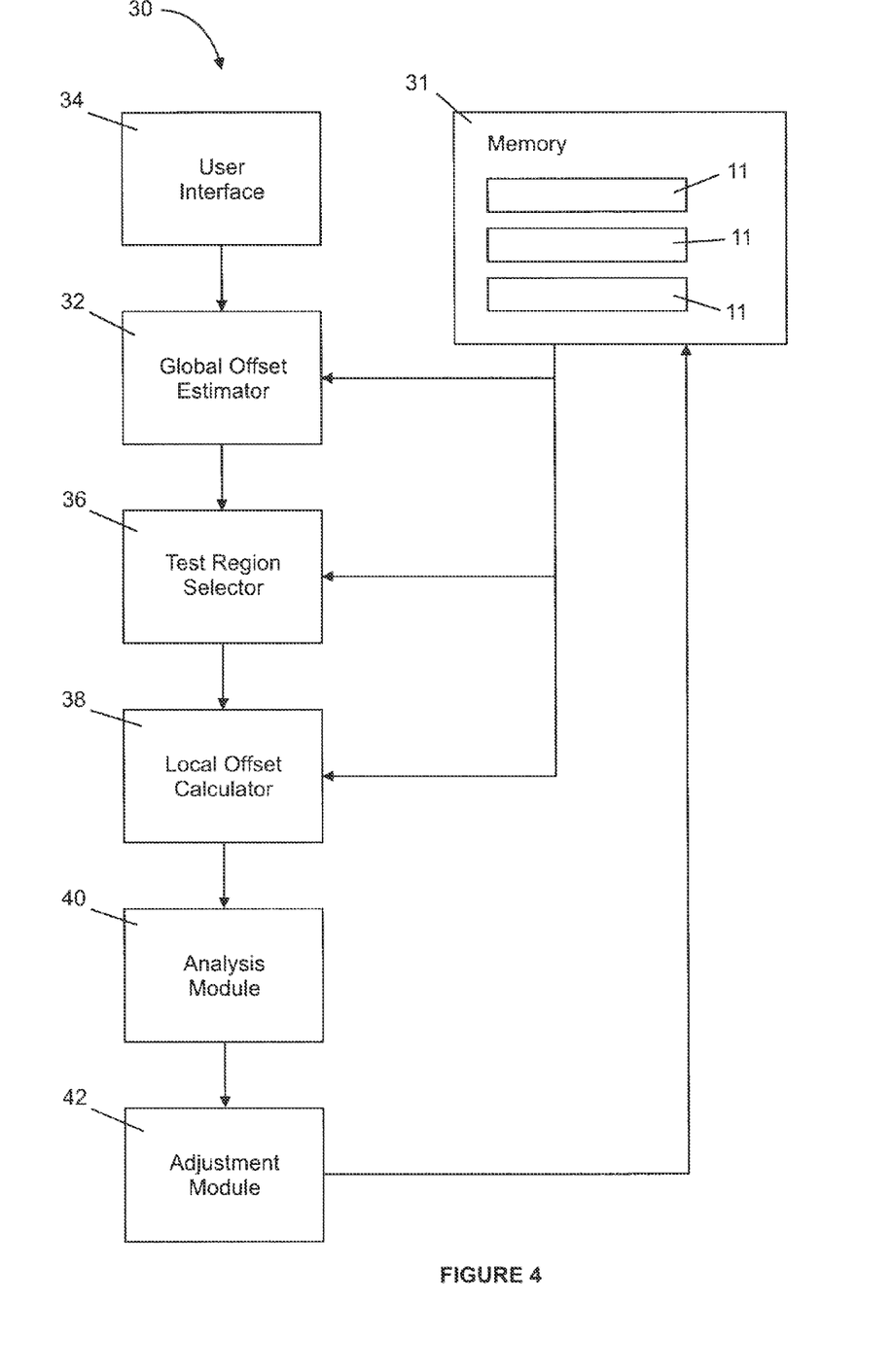
FIG. 4 is a block diagram of apparatus according to an embodiment of the invention.

FIG. 4 depicts an apparatus 30 for determining clip alignment according to an example embodiment of the invention which can be applied to implement method 20. Apparatus 30 comprises a memory 31 holding clips 11 and a global offset estimator 32 that determines an approximate global offset between two clips 11. Global offset estimator may receive input from a user interface 34. An approximate global offset determined by global offset estimator 32 is made available to a test region selector 36. Test region selector 36 uses the approximate global offset to select pairs of test regions in the clips being compared. A local offset calculator 38 attempts to determine a local offset for each pair of test regions identified by test region selector 36. An analysis module 40 determines alignment information for the clips based at least in part on the local offsets. An adjustment module 42 modifies data of one or more of the clips based on the alignment information.

The components of apparatus 30 may comprise software components which cause one or more data processors to perform their functions. For example, the components of apparatus 30 may comprise software routines executed by one or more processors in a computer which runs or supports a video editing software package. In other embodiments, some components of apparatus 30 comprise hardware such as logic circuits, appropriately configured field programmable gate arrays (FPGAs) or the like which perform functions such as determining cross correlations of data to support the operation of apparatus 30.

Some implementation details that may be applied in example embodiments are described below.

A. Global Offset Determination

The following describes a range of techniques that may be applied to estimate a global offset between two clips.

A1 Audio-Based Techniques

In some embodiments, a global offset is estimated by comparing audio data 12B for clips 11. It is not mandatory that the audio data for all clips 11 record sounds from the same set of audio sources. For example, the clips could be a recording of a two-person interview, with clip 11A being the recording of one participant and clip 11B the recording of both participants. In this example case, a global offset may be estimated by comparing a subset of the audio data of clip 11A corresponding to a contiguous region of non-silent data to the audio data for clip 11B.

Direct similarity measures: Direct similarity measures refer to a class of comparison techniques based on the comparison of digital samples at different relative offsets of clips 11A and 11B. The offset or position which yields the strongest similarity is taken to be the offset between the clips. An example of such techniques is cross-correlation. Normalized cross-correlation can be a satisfactory direct similarity measure for use in determining a global offset.

A direct similarity measure or other comparison may be made using full-resolution or reduced-resolution data. Resolution reduction can be implemented by techniques such as:

decimation (for example, RMS-based decimation); or
low-pass filtering followed by subsampling (sometimes called downsampling); or
the like.

After the reduction in resolution, the data set of audio samples is smaller and can be compared using techniques similar to those that could be used to compare full-resolution data.

Derived similarity measures: Derived similarity measures are a class of techniques where comparisons are made between features derived from digital sample values. Some examples of derived features are feature vectors based on frequency characteristics, or audio fingerprints. In some embodiments, features are derived from the audio data of clips 11A and 11B and then the offset which causes the derived features from clip 11A to best match up with the derived features of clip 11B is determined.

Manual comparison: An approximate offset can be obtained by a visual inspection of the audio waveforms of the two clips (or of features visible in the video data of the two clips as described below). Where audio data is being compared, a distinctive event is chosen which has a similar shape in both waveforms. The event can be one that is found opportunistically or it can be one that was recorded specifically for purposes of alignment. Examples of the latter are a clapboard or handclap.

A user may interact with a user interface to indicate the approximate offset. The user interface may display audio waveforms for the audio portions of the clips being compared in an overlapping of side-by side relationship. The user interface may, for example, permit the user to highlight the portions of each of the two waveforms corresponding to the distinctive event, move the waveforms relative one another to visually align the portions of each of the two waveforms corresponding to the distinctive event with one another or with markers provided by the user interface, or the like.

A2 Video-Based Techniques

If the clips being compared each have a video portion then a global offset may be determined with reference to a distinctive video event that can be identified in both clips. The event may be one that occurs opportunistically or an event that was recorded specifically for purposes of alignment. Examples of the latter are a clapboard or a flash.

A user interface may be provided to permit a user to indicate the approximate offset by visual inspection of the clips. In some embodiments, the user interface includes a portion which displays video frames from the clips and a control which permits a user to select frames in each of the clips that correspond to the event.

A3 Metadata-Based Techniques

A global offset may be determined with reference to metadata of the clips. An example of metadata that can be used to determine at least an approximate global offset is metadata which indicates the timing of the occurrence of the samples. One example of such metadata is SMPTE timecode which is sometimes available in professional recording situations. Another example is the time-of-day code that is recorded as part of the consumer-grade DV video format.

If such time-based metadata is available and its accuracy is sufficient (or any errors in the time-based metadata are known), then the metadata can be used to determine a global offset.

A4 Combined Techniques

Two or more techniques may be applied together to obtain a global offset. For example, a manual video based technique could be applied to identify corresponding parts of clips being compared very roughly and an audio-based technique may be applied subsequently. The result of the rough manual video-based technique could be used to select portions of the audio data to display initially for application of the manual audio-based technique. As another example, a metadata-based technique could be applied to obtain a rough global offset (e.g. in a situation where the metadata is not particularly reliable). The rough offset could then be applied as a starting point for another technique. Other groups of two or more of the above techniques could be applied to obtain a global offset.

A5 Detailed Example Embodiment

Figure 5:
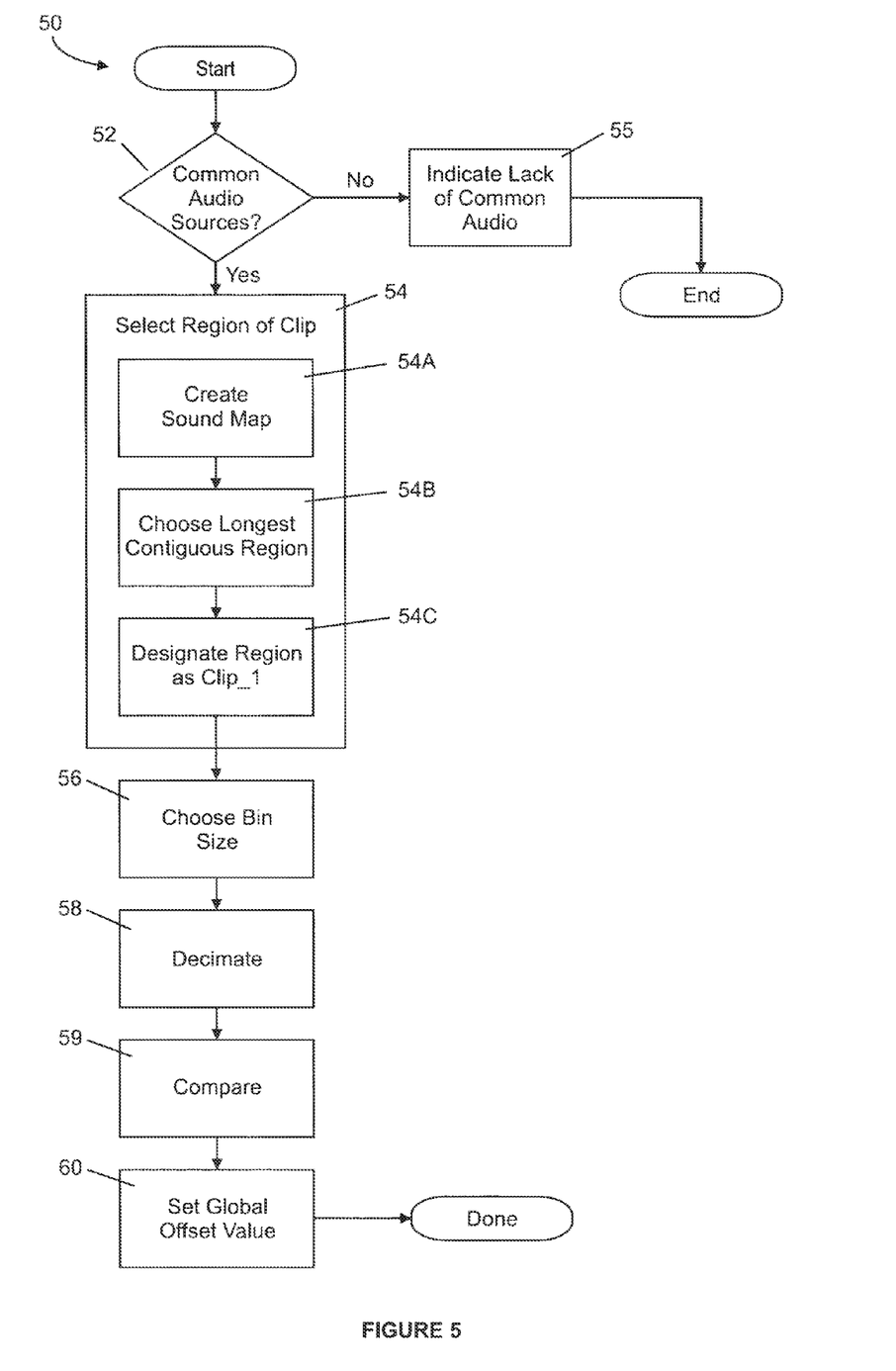
FIG. 5 is a flow chart illustrating an example process for establishing a global offset.

In an example embodiment, global offset is determined by an automated process 50 as illustrated in FIG. 5. Process 50 is based on the audio streams of two clips 11A and 11B. Process 50 comprises:

Determining whether one of the audio streams is a recording of all of or a subset of the audio sources that contribute to the audio stream of the other clip (block 52).

If so, process 50 selects a region of that clip for further processing in block 54.

Otherwise, process 50 indicates that the clips do not appear to have audio content in common and terminates, initiates an alternative process for determining a global offset between the clips, or marks the clips as being non-overlapping in time.

Block 54, which selects a region of the clip for further processing, involves:

Creating a sound map for the clip identified in block 52 as described below (block 54A);

Choosing the longest contiguous region of that sound map where all the values are equal to 1 (block 54B); and Designating the contiguous region identified in block 54B as the region for further processing, which may be called "clip_1" and designating the entire other clip as "clip_2" (block 54C).

Processing continues with block 56 which chooses a bin size for decimation. The bin size is chosen to be small enough that the volume envelope of the audio is reasonably preserved. At the same time, the bin size can be large enough so that data for least one of the decimated clip_1 or clip_2 can fit into available computing memory. The bin size may, for example, correspond to 10 ms-50 ms of audio data. For example, the bin size could correspond to 20 ms of audio data. The bin size may be predetermined. The bin size may be selected based upon the amount of physical computing memory available for the decimated clip data. Process 50 is not particularly sensitive to the value established for the bin size.

In block 58 the audio data of clip_1 and clip_2 is decimated. This may be done, for example by calculating the RMS value of the audio samples over each bin, where the bins are adjacent and non-overlapping. Other decimation methods such as summing the absolute values of the audio samples within each bin could also be used. Decimation reduces the size of the data in clip_1 and clip_2.

In block 59 the decimated audio data for clip_1 and clip_2 is compared, for example by means of a one-dimensional normalized cross-correlation. For efficient processing, the mathematical technique of computing the cross-correlation via the fast Fourier transform (FFT) can be used.

In block 60 the global offset is set to be the offset corresponding to the position where the comparison is strongest. For example, block 60 may establish the global offset as the location of the maximum absolute value of the correlation function. Of course, the position of clip_1 within the audio data for the clip selected in block 52 is taken into account in establishing the global offset between the two clips.

B Local Offsets Determination

The following describes a range of techniques that may be applied to estimate local offsets between selected test regions of two clips.

B1 Selection of Test Regions

An ideal set of test regions will have the following characteristics:

There will be enough regions to allow for statistical validity of the results.

The test regions of one clip will correspond to test regions that lie within the duration of the other clip, as determined by the global offset estimate.

The width of the test regions is sufficient to encompass the inaccuracy in the estimation of the global offset.

The width of the test regions is sufficient to accommodate the possibility of reasonable changes in offset over time.

The audio signal is not silent in the test region.

The test regions have some separation from each other and cover a reasonable portion of the range of expected overlap of the clips.

One way to select a set of test regions that are well-separated is to choose the positions of a number of points in the sound map that is equal to the desired number of test regions and which correspond to acceptable test regions (e.g. within temporally-overlapping portions of the audio of the clips, non-zero audio signal etc.) such that the sum of square distances between those positions is a minimum.

A more sophisticated approach to selecting a set of test regions is possible in the case where the alignment varies over time. In this case, the estimate of the global offset can be modified as the time behaviour becomes better estimated. This can help ensure that the corresponding test regions do in fact overlap.

B2 Comparison of Test Regions

To compare corresponding test regions of two clips, the test region "region_2" for one of the clips (e.g. clip_2) is chosen to be larger than the corresponding test region "region_1" in the other clip (e.g. clip_1). The smaller test-region, region_1, is compared at multiple locations within the corresponding larger test region, region_2. The location of the best match is used as the estimate of the local offset in that region.

It is convenient but not mandatory that the larger test regions all be in one clip and the smaller test regions be in the other clip. It is convenient but not necessary that the larger test regions be of the same size as one another. It is convenient but not necessary that the smaller test regions be of the same size as one another.

The techniques used to compare the data region_1 and region_2 may be any suitable direct similarity measures, derived similarity measures, and could be the same as or similar to those described above with respect to block 59. Since the test regions are generally small compared to the whole clip techniques that may be prohibitively computationally expensive when applied to the whole clip are available. For example, normalized cross-correlation may be used to compare the region_1 and region_2 data.

B3 Detailed Example Embodiment

Figure 6:
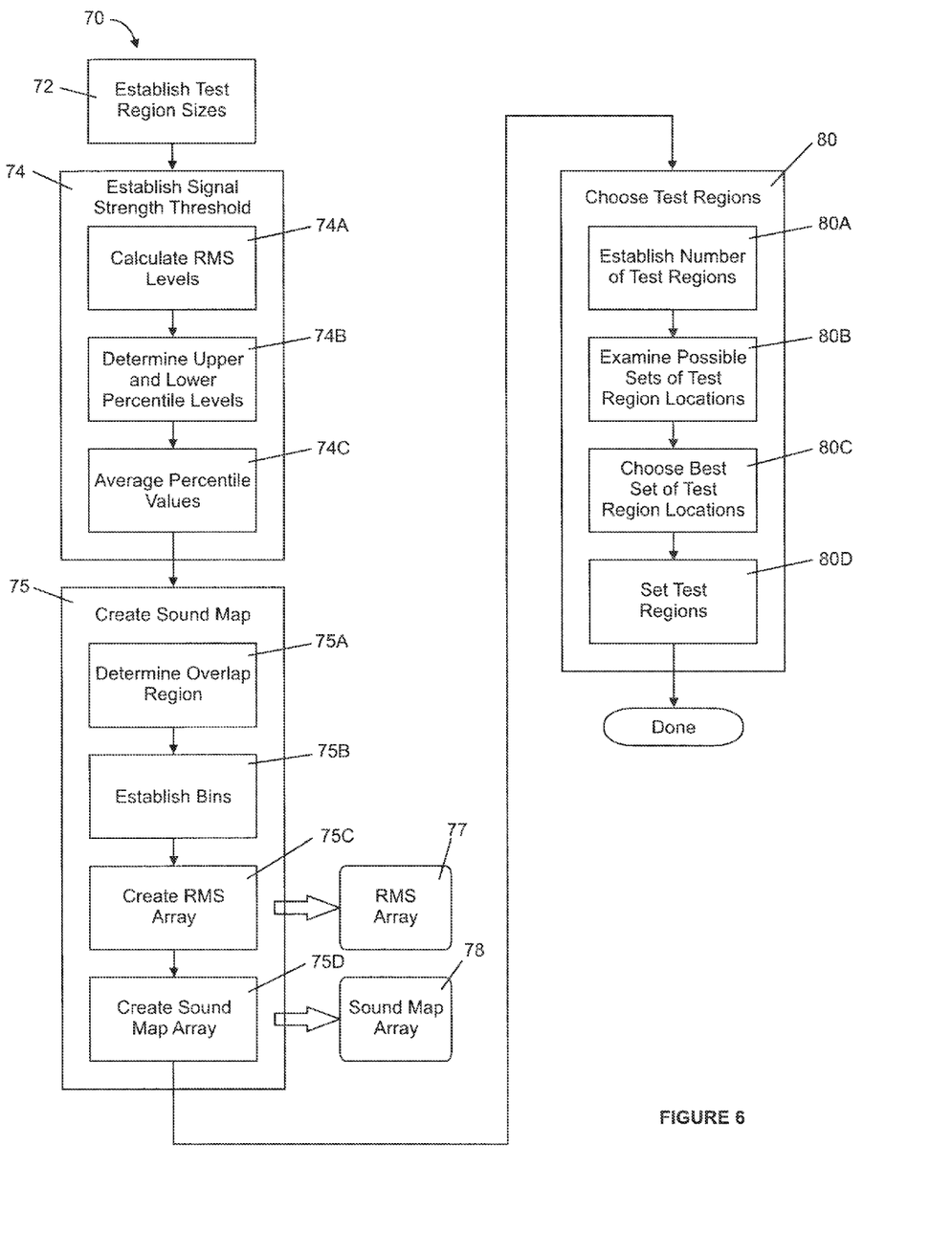
FIG. 6 is a flow chart illustrating an example process for identifying pairs of corresponding test regions and determining local offsets between the corresponding test regions.

In an example embodiment, test regions are selected by a process 70 as shown in FIG. 6. Block 72 establishes test region sizes for the first and second clips. The test regions may, for example, each be on the order of one to 10 seconds or so. For example, the shorter test regions may have lengths of about 1 second and the longer test regions may have lengths of about 5 seconds. The sizes of the test regions may be predetermined.

The lengths of the test regions may be determined based on the estimated accuracy of the global offset estimate and the estimated amount of time variation in the local offsets. In some embodiments predetermined conservative values for the lengths of the test regions are used.

Block 74 establishes a signal strength threshold for the first clip. This threshold may be predetermined. In the illustrated embodiment, block 74 comprises:

Calculating the RMS levels of the digital samples of the first clip over bins of a fixed size, for example, a size corresponding to 50 ms (block 74A);

Calculating the RMS levels at a lower percentile and a higher percentile, for example the 5th and 95th percentiles respectively (block 74B); and, Setting the signal strength threshold to a value equal to the average of the RMS levels calculated in block 74B (block 74C). For example, where the $5^{th}$ percentile value is indicated by $R_5$ and the $95^{th}$ percentile is indicated by $R_{95}$ then the signal strength threshold value may be given by:

$$\frac{R_5 + R_{95}}{2}$$

Block 75 uses the signal strength threshold from block 74 to create a "sound map" which describes which regions of the first clip are loud and which are quiet. In the example embodiment, block 75 comprises:

Determining an overlap region of the first clip such that this region lies completely within the corresponding region of the second clip, including a buffer zone at each end (block 75A);

Establishing a fixed number of bins. The number of bins may be predetermined. For example, the number of bins may be 1024. (block 75B);

Creating an RMS array 77 whose members include the RMS values of the digital samples of the first clip for each bin (block 75C);

Creating a sound map array 78 with the same number of bins as RMS array 77 and with the value of each array element of sound map array 78 being 1 if the value of the corresponding RMS bin is greater than the signal strength threshold and 0 otherwise (block 75D).

Block 80 chooses test regions with reference to sound map array 78 that are well spaced within the temporally overlapping portions of the clips. In the illustrated embodiment, block 80 comprises:

Establishing the number of test regions (block 80A);

Examining the possible sets of locations within the sound map where the number of locations in each possible set is the same as the number of test regions established in block 80A and each location has a value of 1 in the sound map array 78 (block 80B);

Choosing a set of test point locations, for example by using a dynamic programming technique to determine the set of possible locations from block 80B which is optimal. For example, a set may be selected such that the set contains one test point at each end of the sound map and the sum of the square distances between adjacent test points is a minimum (block 80C).

Setting the test regions to be the regions of the first clip of the size determined above having centers at the test point locations chosen in block 80C (block 80D).

C Analysis

The local offsets as determined above comprise a data set of measurements of the offset between clips 11A and 11B at several locations along their lengths. If clips 11A and 11B overlap, then there is a function which is defined by the alignment relation between them. The function may take as input a sample number from clip 11A that corresponds to a particular event and provide as output a sample number from clip 11B that corresponds to the same event, or vice versa. For example, the alignment function for clips i and j may be given by $A_{ij}(n^i)=n^j$ Where i and j are indices identifying the clips being compared $n^i$ is a sample number from clip i, and $n^j$ is the corresponding sample number from clip j. The alignment function may, in the alternative, provide equivalent information. For example, the function may relate sample numbers in each clip to some separate time scale.

An alignment function $A_{ij}$ may be modeled by one of several mathematical functions, examples being:

constant: single global offset, linear: offset plus a constant difference in recording rates, piecewise linear: as for linear but with occasional dropouts of data, more complicated functions such as polynomial functions, and the like.

Analysis of the local offsets may be performed to determine whether the initial global offset was valid. If so, the analysis may determine the parameters of a model alignment function for the clips. Each of these is discussed in the following sections.

In some embodiments the local offsets are analyzed to determine whether the lengths selected for the test regions may have been inadequate. In such embodiments, the steps leading up to obtaining the local offsets may be repeated with larger or different test regions in the event that the analysis determines that the lengths of the test regions may have been insufficient.

C1 Validity Determination

Under some circumstances, techniques as described above in Section A may provide a bad estimate of a global offset. For example, the techniques could sometimes give a value for a global offset in a case where the clips do not overlap or the estimated global offset may have a large error. In such cases the estimate of the global offset is invalid.

If the global offset is valid then the measured local offsets should equal the differences in the input and output values provided by the alignment function plus errors caused by factors such as imperfections in the measurement technique, differences in the recording devices or variations in the environment of the recording. The actual measurements can be analyzed to determine whether they are the result of alignment plus errors, or are invalid numbers because there is no alignment.

C2 Handling of Outliers

If the measurement errors are normally distributed then there are several techniques for assessing the confidence level that the measurements are valid. However, it is often the case that some measurements are outliers, that is they have a large error not consistent with a normal distribution. This can happen for example if there are two microphones recording the same event and there is a loud noise near one of the microphones, but not the other.

Eliminating such outliers can lead to more reliable results in the remaining analysis. One technique that may be applied to remove such outliers is to fit the measured local offsets to a linear function using a robust fitting function. For example the local offsets may be plotted as a function of sample number (or time or other measure of position in the clips). A line which minimizes the sum of distances of the local offsets from the line may be determined. Then the median of the distances of the local offset points from the line may be determined. Any local offset measurement whose distance from the line is more than some factor (e.g. 3) of that median distance may be treated as an outlier. Outliers may, for example, be ignored or given reduced weight in further analysis.

In the case where it is desired to detect data dropouts, the above robust line fitting technique may be modified to determine a robust fit to a piecewise linear function.

C3 Variance Comparison

Once outliers have been eliminated, the remaining errors can be treated as having a normal distribution. In the following, it is assumed that any outliers have been removed.

In the case where data dropouts are not being considered, the variance of the distances from the best fit line can be compared to the variance expected from random data. If the length of the test region is L, then the expected variance of uniformly distributed random data is $L^2/12$. If the measured variance is less than some multiple (e.g., ½) of the uniform variance, that is an indication that the measurements are valid.

C4 Chi-Square Statistic

More elaborate statistics can be applied to the local offset measurements, again assuming that outliers have been eliminated. A goodness-of-fit statistic can be calculated and if the confidence level is above a chosen threshold, then the determined alignment parameters can be regarded as valid. For example the chi-square test for goodness of fit can be applied to obtain the probability statistic Q. If the chi-square statistic satisfies Q>0.1 or another suitable threshold then this is an indication that the fit to the line is valid.

C5 Alignment Determination

The determination of parameters of an alignment function can done at the same time as a validity determination of section or as a separate step. Some embodiments provide a plurality of model alignment functions. In such embodiments a model that appears to best represent the local offset data is chosen for the alignment function and the parameters of that model are determined from the measured local offsets. Some example models are:

constant;
linear;
piecewise-linear;
polynomial;
sinusoidal.

C6 Detailed Example Embodiment

Figure 7:
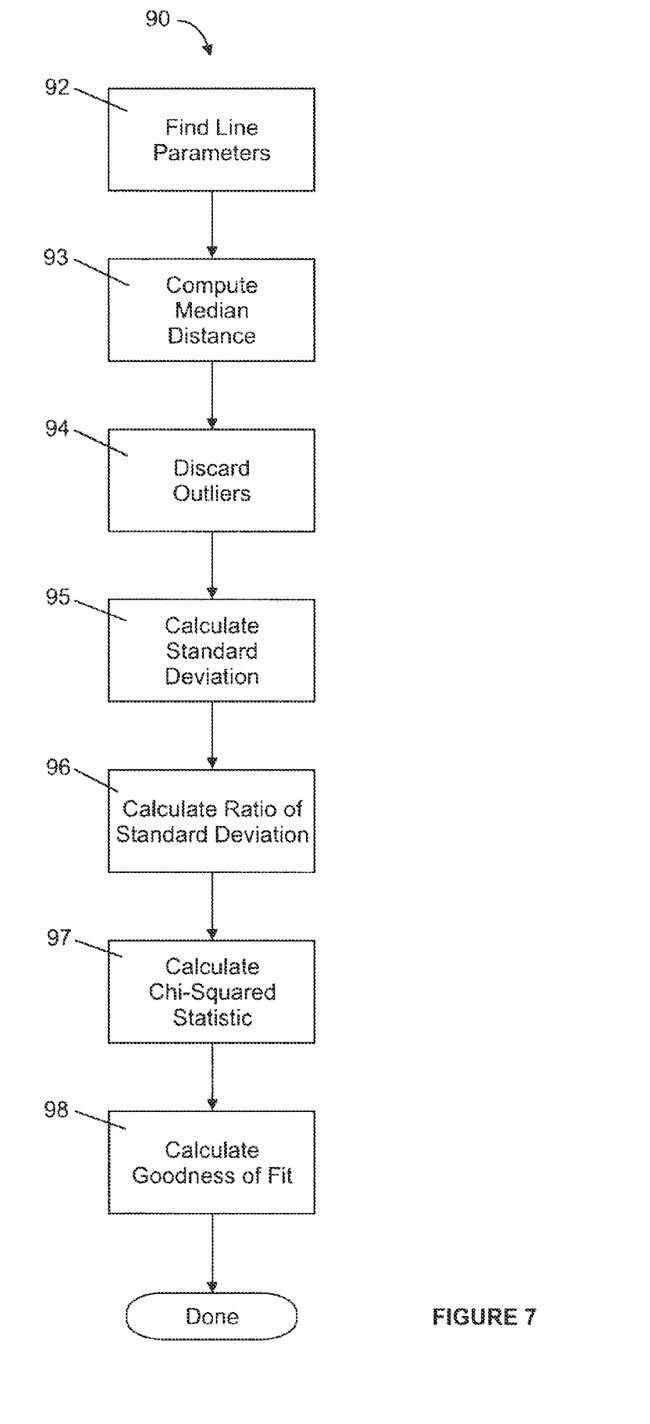
FIG. 7 is a flow chart illustrating an example process for analyzing local offset data.

In an example embodiment, local offsets are analyzed by a process 90 as shown in FIG. 7. Block 92 finds the parameters of the line which best fits the local offset data points. The line may be chosen to be the line for which the sum of distances from the local offset data points to the line is minimized. The median of the distances from the local data points to the line is computed in block 93. In block 94 any outliers are discarded. For example, local offset data points farther from the line than a threshold distance may be discarded. The threshold distance may be a function of the median distance determined in block 93. For example, the threshold distance may be a suitable multiple (e.g. 3) of the median distance. The output of block 94 is a set of filtered data points.

Block 95 calculates the standard deviation of the distances of the filtered data points from the line. Block 96 calculates a ratio of the standard deviation from block 95 with the theoretical standard deviation of uniformly distributed random data over a range equal to the test region size. Block 97 calculates the chi-square statistic of the filtered data points using the standard deviation of random data as the error estimate.

Block 98 calculates the goodness of fit measure, Q, from that chi-square statistic. Block 98 identifies the match as valid if the standard deviation ratio is less than a desired threshold, such as 0.3 and the chi-square statistic is greater than a desired threshold, for example, Q>0.1

D Clip Corrections

If the alignment determination is valid, the foregoing processes yield an estimated alignment function $A_{12}$ relating two clips. The estimated alignment function can be used to modify the data for the clips, if desired, and then to implement higher-level applications. Modified clips may be saved in a memory or exported.

D1 Drift Correction

If $A_{12}$ is a linear function, its slope can be used to adjust the duration of one of the clips so that its sample rate matches that of the other clip. An example of such an adjustment procedure comprises adding or removing samples from the clip at regular intervals where the signal energy is low. In this way, the adjustment points are not audible and there is no noticeable change of pitch.

D2 Dropout Correction

If $A_{12}$ is piecewise linear, then one or both clips have dropouts. The locations of the dropouts correspond to the discontinuities in $A_{12}$ and the durations of the dropouts correspond to the sizes of the discontinuities. The clips can be adjusted to correct for dropouts by inserting sufficient samples at the dropout locations.

E Application Examples

The following sections describe some applications of the previously described methods and apparatus for automatic alignment of media clips.

E1 Plug-in to Host Application

Many modern software applications enable third parties to extend their capabilities by providing programming interfaces (APIs). Developers can write plug-ins that use these interfaces to add functionality to or control the host application. The invention can be implemented as a plug-in. For example, a video editor plug-in could align media clips that are part of the editor's project media by executing the following steps:

querying the host application for the data and metadata for the clips which the user wants to align;

receiving from the host application information about those clips, such as their start times, durations, sample rates and location of related files stored on disk;

optionally requesting that the host application initiate a user interaction whereby the user can provide an estimated offset for a pair of clips;

determining the alignment function between each pair of clips; and, communicating to the host application new start times and durations for the clips, which the host uses to modify the position of the clips and possibly apply time stretching to them.

In some embodiments, the host application displays representations of the modified clips on a display which includes a time line wherein positions of the modified clips on the timeline are based at least in part on the information communicated to the host application. In some embodiments, the host application may play the clips in different windows on a display with the relative timing of playback of the clips based at least in part on the information communicated to the host application.

E2 Standalone Application

The invention can also be implemented as a standalone application. An example usage of such an application would be for the user to align a set of clips. The standalone application may perform by:

specifying which clips are to be aligned, for example, by allowing a user to select their file names from a list;

initiating the determination of the alignment function;

choosing what action to take with the results of the alignment process, for example to pad or trim the clips, or timestretch them (if the clips are modified, the modified clips may be stored in a memory or other storage device for future use, representations of the clips may be displayed on a display, the clips may be played back in different windows on a display with the relative timing of playback of the clips based at least in part on the result of the alignment process etc.); and alternatively, choosing to just have a report of the determined parameters of the alignment function which are then taken to another application for further processing.

The report may be displayed, printed, delivered to another application, stored or the like.

E3 Multicamera Event Recording

Multicamera event recordings are those where several cameras (and possibly separate audio recorders) are used at the same location and the same time to record a live event. For example, suppose Alice is a videographer who wishes to record a live concert. She records the concert with the following equipment:

Four camcorders using their built-in microphones;

A pair of microphones in the audience area recording onto a portable media recorder; and An audio feed from the PA system recording onto four tracks on a hard disk recorder.

None of the recording devices has access to a common synchronization clock and none of the devices are slaved to one another.

After the concert is complete, Alice has several media clips of the concert. She wants to create a movie of the concert with multiple camera angles and high-quality audio. She adds the clips to the timeline of a video editing program but because there is no synchronization data available, the location of the clips on the timeline is not correct.

The video editing program has a plug-in installed which implements the automatic synchronization process described herein. Alice selects the clips that need to be aligned and invokes the plug-in. The plug-in analyzes the clips, determines their relative offsets and adjusts their positions on the timeline accordingly.

At this point, Alice uses the existing functionality of the editing program to switch between cameras and mix the audio. Not only is the video properly aligned, but the sound sources are so precisely synchronized that they can be mixed together, for example to add some room ambiance to the audio from the PA microphones.

E4 Music Video

Bob wants to make an MTV™-style music video, with a single complete song for the soundtrack and fast-paced cuts between video images of the performer. In the resulting video, the performer makes many costume changes, several recording locations are used and there are multiple camera angles.

Bob records the performer multiple times. Each time, a pre-recording of the song is played and the performer lip-syncs to the music. In between takes, the performer may change costume, additional performers may be added or removed from the set, and the recording location can change.

When he has finished recording, Bob has several video clips with similar sound, namely, the song that was recorded by the camera microphones. He also has the original, high-quality pre-recorded version of the song which he wants to use as the sound track of the final production. He adds all the media clips to his video editing program and invokes the automatic alignment plug-in to align them. He then invokes another plug-in which automatically puts in camera switch points corresponding to the typical pacing of a music video. He watches the results and makes further manual adjustments to the switch points, adds additional special effects, and titles.

Switch points may be identified automatically in various ways. In a simple embodiment, initial switch points are set to occur at random times according to a probability distribution selected so that no individual duration is too long or too short. An option may be provided to allow a user to select an average time between switch points. A more sophisticated algorithm detects the beat of music in an audio track and times the initial switch points to occur in time with the music.

E5 Double-Ender Interview

Carol is a podcaster who wants to conduct an interview with a guest in another city. She will record the interview using a technique known as a "tape sync" or "double-ender". In this technique, two (or more) people in conversation in different locations talk on the telephone. The conversation is recorded. At the same time, independent audio and/or video recordings are made at each location. The telephone recording is not very good quality, but is used for synchronization. Only the local, higher quality recordings are heard in the final production.

Carol's interview is with David. She phones him and records the call using a telephone coupling device. At the same time, she sets up a camera and records video of herself. For the best quality audio, she wears a lavaliere microphone which is recorded onto a portable media player/recorder. David has a similar recording setup at his location.

After the interview is finished, David captures his audio and video to his computer and uploads it to his Web site from where Carol downloads media files containing the audio and video. Carol now has two video clips and three audio clips, namely:

a video of Carol with an audio track;
a video of David with an audio track;
high-quality audio of Carol;
high-quality audio of David; and
a telephone recording of both Carol and David.

Carol selects the clip files in her computer and drags and drops them onto a program which incorporates the automatic synchronization algorithm. The program does the synchronization and then automatically determines times that are suitable to switch from one camera to another. The program may do this by identifying from the audio data segments where Carol is speaking and segments where David is speaking. The program may select switch points occurring slightly before each person begins to speak.

The program automatically edits the video clips to incorporate those switch points and retains just the high-quality audio for the final production. Carol imports the resulting production into a simple video editor where she can add a short standard introduction and title and fine-tune the switch points, if necessary.

E6 Special Effects

Ellen owns a Yamaha Disklavier™ piano which has the ability to record while the piano is being played and later play back the recording by moving the keys and pedals. She wants to make a recording of Frank playing the piano and superimpose images of the piano playing while Frank is at the keyboard and when the piano is playing itself. By adjusting the transparency of the images, Frank can fade in and out of the picture while the piano continues to play uninterrupted.

In addition Ellen wants to have a high-quality audio recording but doesn't want the microphones to show in the video. Finally she wants to mix in other video shots of the mechanism of the piano while it is playing, for example to show the hammers striking the strings and the movement of the pedals.

To achieve this, Ellen first records a video of Frank playing the piano, while the piano records the key and pedal movements. Her camera is mounted on a tripod and does not move during the recording. Leaving the camera in place she then has the piano play back its recording without Frank and she records that. For another take, Ellen places microphones in appropriate locations in and around the piano to get high-quality audio of the music. Finally, she takes several videos of the piano activity while it is playing itself.

At the end of production, Ellen has:
one video with Frank at the keyboard;
one video from the same angle with Frank not at the keyboard;
several videos taken while the piano is playing itself; and
a high-quality audio track.

Ellen loads these media clips into her video editor and invokes the automatic synchronization plug-in to align them all. She then uses the multicamera facilities of her editor to complete the post-production work.

E7 Automated Dialog Replacement (ADR)

Automated dialog replacement (ADR) is at technique used in film and video production in which dialog is re-recorded during post-production to replace dialog in the original recording. There can be several reasons why ADR is needed, but typically it is because the original recording was marred by background noise inherent in location recording and a cleaner recording made in the studio is desired.

ADR is normally a tedious time-consuming process because of the need for actors to precisely time their re-creation of the dialog with the dialog in the original recording. The actor watches and listens to the original, which is repeatedly played back, until he can say the lines again with sufficiency accuracy that the new recording can replace the old.

Gayle is an ADR Supervisor whose job it is to manage the ADR process for some lines that Howard needs to re-record. Gayle is using software that incorporates the automatic synchronization process. Howard listens to the original recording in the traditional way and then speaks his lines. Unlike the traditional method however, Howard does not need to start and stop speaking at as precise times. Instead Gayle uses the software to automatically align his recording with the original recording. Gayle can view the results immediately and decide if further recording is necessary. This can save much time of the actors and production crew.

E8 Sound Track Replacement

Jill wants to make instructional dance videos. She records dance classes from several angles. The music for the dancers is provided by a stereo system playing back CDs over loudspeakers. It is not recorded with good enough quality for the final production. However Jill has access to those CDs. She loads the music from the CDs into her video editor along with the video clips and any other audio recordings she took. She invokes the automatic synchronization plug-in to align all the clips and starts the editing process. During editing she can substitute the CD music for the live recordings, or mix the CD audio with the live audio to give a more natural sound. The precise alignment between the audio sources makes this possible.

Certain implementations of the invention comprise computer processors which execute software instructions which cause the processors to perform a method of the invention. For example, one or more processors in a computer workstation or other video editing system may implement the methods of FIGS. 3, 5, 6 and/or 7 by executing software instructions in a program memory accessible to the processors. The invention may also be provided in the form of a program product. The program product may comprise any medium which carries a set of computer-readable instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, features of embodiments as described above may be used in combination with features of other embodiments described above.

What is claimed is:

1. A method for temporally aligning a plurality of video recordings of an event made by a plurality of cameras, the video recordings each including a video track recorded by one of the cameras and an audio track recorded by the same one of the cameras, the audio tracks of the video recordings containing audio data representing recorded sounds of the event, the method comprising:
    determining a temporal relationship between a pair of the video recordings by processing the audio data representing the recorded sounds to determine an offset between the video recordings of the pair for which a direct or derived measure of similarity between the audio data for the video recordings of the pair of video recordings is maximized, and
    temporally aligning at least two of the plurality of video recordings based upon the offset between the video recordings of the pair.

2. The method according to claim 1 further comprising temporally aligning a sound recording of the event with a first video recording of the pair of video recordings, the sound recording comprising audio data representing recorded sounds of the event, wherein temporally aligning the sound recording with the first video recording comprises processing the audio data of the sound recording and the audio data of the first video recording to determine an offset between the sound recording and the first video recording for which a direct or derived measure of similarity between the audio data of the sound recording and the audio data of the first video recording is maximized.

3. The method according to claim 1 comprising displaying indicia representing each of the pair of video recordings on a time line of a video editor and adjusting a relative position of the indicia on the time line based on the offset.

4. The method according to claim 3 comprising receiving user input specifying an approximate offset and using the approximate offset in the processing.

5. The method according to claim 4 wherein receiving user input comprises displaying audio waveforms for the audio data of the pair of video recordings in an overlapping or side-by side relationship on a display and receiving user input to move the displayed waveforms relative one another.

6. The method according to claim 4 wherein receiving user input comprises receiving user input adding markers at corresponding locations in the pair of video recordings.

7. The method according to claim 1 wherein the processing comprises low-pass filtering the audio data and subsampling the audio data.

8. The method according to claim 1 wherein each of the video recordings comprises metadata and the method comprises determining an approximate temporal offset of the pair of video recordings based on the metadata of the pair of video recordings and using the approximate offset in the processing.

9. The method according to claim 1 comprising repeating the processing for a plurality of pairs of the plurality of video recordings to obtain a corresponding plurality of offsets and, based on the offsets, automatically organizing the plurality of video recordings into one or more groups such that all of the video recordings associated with each of the one or more groups have a known temporal relationship to one another.

10. A method according to claim 1 comprising, for one or more pairs of the video recordings determining based on the audio data that the pair of video recordings do not overlap temporally.

11. The method according to claim 1 wherein the processing comprises determining audio fingerprints for the audio tracks of the pair of video recordings and comparing the audio fingerprints.

12. The method according to claim 1 wherein the processing comprises deriving feature vectors based on frequency characteristics of the audio data of the pair of video recordings and determining the offset which causes the feature vectors corresponding to a first video recording of the pair of video recordings to best match up with the feature vectors corresponding to a second video recording of the pair of video recordings.

13. The method according to claim 1 wherein the processing comprises comparing features derived from the audio data of the pair of video recordings wherein the features are based on the frequency content of the audio data.

14. The method according to claim 1 wherein the processing comprises determining a direct similarity measure between the audio data from the video recordings of the pair of video recordings using full-resolution audio data from the video recordings of the pair of video recordings.

15. The method according to claim 1 wherein the processing comprises determining a direct similarity measure between the audio data from the video recordings of the pair of video recordings using reduced-resolution audio data from the video recordings of the pair of video recordings.

16. The method according to claim 15 comprising reducing the resolution of the audio data from the video recordings of the pair of video recordings by decimation or downsampling.

17. The method according to claim 1 wherein the processing comprises determining a plurality of local offsets, the local offsets each corresponding to a different pair of test regions within temporally-overlapping sections of the audio tracks of the pair of video recordings.

18. The method according to claim 1 comprising:
    estimating a global offset between the video recordings of the pair of video recordings;
    choosing a first test region of the audio data of a first one of the pair of video recordings and identifying a corresponding second test region in the audio data of a second one of the pair of video recordings based at least in part on the estimated global offset; and comparing the audio data of the first and second test regions to determine a local offset.

19. A system comprising:

a memory circuit configured and arranged to store a plurality of video recordings of an event made by a plurality of cameras, the video recordings each including a video track recorded by one of the cameras and an audio track recorded by the same one of the cameras, the audio tracks of the video recordings containing audio data representing recorded sounds of the event; and a logic circuit configured and arranged with software to:

determine temporal alignment of the plurality of video recordings by determining a temporal relationship between a pair of the video recordings based at least in part on processing the audio data representing the recorded sounds to determine an offset between the video recordings of the pair for which a direct or derived measure of similarity between the audio data for the video recordings of the pair of video recordings is maximized, and temporally align at least two of the plurality of video recordings based upon the offset between the video recordings of the pair.

20. A method comprising:

determining a temporal offset between a pair of a plurality of video recordings of an event made by different cameras, the video recordings each including digital video data recorded by one of the cameras and digital audio data recorded by the same one of the cameras, the audio data representing recorded sounds of the event, by maximizing a direct or derived measure of similarity between the audio data for the pair of video recordings, and determining the offset based on the maximizing; and temporally aligning at least two of the plurality of video recordings based upon the offset between the video recordings of the pair.

* * * * *